United States Patent Office 3,669,621

Patented June 13, 1972

3,669,621

PROCESS FOR PRODUCING A SUBSTANTIALLY PHOSPHATE ION-FREE AMMONIUM FLUORIDE SOLUTION

Manfred Schulze, Opladen, and Werner Schabacher, Leverkusen, Germany, assignors to Farbenfabriken Bayer Aktiengesellschaft, Leverkusen, Germany No Drawing. Filed July 1, 1970, Ser. No. 51,703
Claims priority, application Germany, Aug. 23, 1969, P 19 42 925.5
Int. Cl. C01c *1/16, 11/24, 33/00*
U.S. Cl. 23—88 4 Claims

ABSTRACT OF THE DISCLOSURE

Hexafluorosilicic acid solutions are freed of phosphate ions by addition of ferric ion and introduction of ammonia gas to precipitate ferric phosphate. Substantially phosphate ion-free ammonium fluoride solutions are obtained from the hexafluorosilicic acid solutions.

This invention relates to the processing of phosphate-containing aqueous solutions of hexafluorosilicic acid.

Almost all phosphate-containing minerals processed in the chemical industry contain more or less large quantities of bound fluorine. During disintegration the bound fluorine is reacted with mineral acids in the presence of silicic acid to form silicon tetrafluoride, in which form it passes into the exhaust gases. Here, by washing with water it is converted into hexafluorosilicic acid which is commercially available in the form of an aqueous solution containing from 10% to 30% by weight of $H_2SiF_6$. These solutions have an average phosphate content (expressed as $P_2O_5$) of from 0.1% to 2% by weight.

There are several processes for converting hexafluorosilicic acid by ammoniacal hydrolysis into a solution of $NH_4F$ and silicic acid ($SiO_2 \cdot xH_2O$). When this process is carried out under normal conditions it is not possible to separate the contaminating phosphate, although it is the very absence of phosphate which is so important in many applications of ammonium fluoride. For example, the $NH_4F$ solution required for the production of aluminium fluoride or cryolite must be free from phosphate because in the fluoride synthesis from ammonium fluoride some of the phosphate automatically enters the end product in quantities that are too large to be accepted by the aluminium industry.

Accordingly, a few attempts have already been made to separate the phosphate ions from $NH_4F$ solutions which have been obtained from $H_2SiF_6$ solutions.

According to U.S. patent specification No. 3,201,193 phosphate is separated from $NH_4F$ solutions obtained by the ammoniacal hydrolysis of hexafluorosilicic acid by the addition of oxides, hydroxides, carbonates or fluorides of the elements of Group II–B of the Periodic System, especially ZnO, CdO and $ZnF_2$, at a pH value of from 6 to 8. The corresponding substantially insoluble ammonium phosphates are formed. In cases where ZnO is used for example, it is stirred in the phosphate-containing solution for some 30 to 120 minutes while heating to around 50° C., and with the pH adjusted to a value of from 7.0 to 7.5. One disadvantage of this process is the high cost of the proposed precipitants, and the long reaction time. In addition, there is a danger of the zinc (or cadmium) being dissolved in the event of an excessively long heating of the deposit.

U.S. patent specification No. 2, 816,818 relates to a process in which the phosphate is separated in the form of triammonium phosphate. The aqueous ammonium flouride solution which contains the contaminating phosphate in the form of $PO_4^{---}$ and $HPO_4^{--}$ ions, has ammonia gas added to it while cooling until it is saturated (1 atms. $NH_3$ partial pressure at 22° C.). The resulting relatively high concentration of $NH_4^+$ ions reduces the solubility of the triammonium phosphate to such an extent that it precipitates. A disadvantage of this process is that an extremely high concentration of ammonia, which can only be adjusted in a pressure apparatus, is required for the quantitative separation of the phosphate. In addition, it is necessary to operate at room temperature which, especially with relatively high $NH_4F$ concentrations, leads to the formation of substantially unfilterable highly viscous solutions.

U.S. patent specification No. 2,945,745 relates to a process in which the phosphate is separated as follows: ammonia is initially added to the aqueous hexafluorosilicic acid in such a quantity that only $(NH_4)_2SiF_6$ is formed which, after the solution has been concentrated, is crystallized out, filtered off and washed, the phosphate remaining in solution. The ammonium hexafluorosilicate separated is redissolved and converted by reaction with ammonia into ammonium fluoride and silicic acid. This process is extremely complex in comparison both with the processes described above and with the process according to the invention.

A process for the separation of phosphate from an aqueous hexafluorosilicic acid solution has now been found which avoids the difficulties and disadvantages attending the processes described above and which provides extremely good separation. The process according to the invention is distinguished by the fact that the phosphate is precipitated in the form of iron(III)phosphate by the addition of ammonia to the hexafluorosilicic acid solution until the pH reaches about 2 to 4 in the presence of iron(III)ions in about 1.1 to 2 times the molar amount of the phosphate, and separated off.

According to the invention, the phosphate is separated off in the form of iron(III)phosphate ($FePO_4$) during neutralization of the aqueous hexafluorosilicic acid by initially introducing gaseous ammonia in the presence of $Fe^{+++}$ ions until the pH value is raised to about 2 to 4 and more particularly until the pH is raised to about 3, resulting in the formation of a readily filterable voluminous deposit which is separated off and washed. When $NH_3$ is introduced to raise the pH to about 3, the solution is heated almost to its boiling point by the heat of neutralization. In cases where highly concentrated $H_2SiF_6$ solutions (25% to 30%) are used, heating to a temperature of from 80° C. to 90° C. is necessary in any case because ammonium hexafluorosilicate would be precipitated at lower temperatures. Heating of the reaction solution to 90° C. offers the further advantages that the reaction is completed quickly, a readily filterable deposit is precipitated and the viscosity of the salt solution is reduced so that they are easy to filter. Following separation of the iron phosphate, the solution can be processed by conventional methods into ammonium fluoride and $SiO_2.xH_2O$. To this end, the ammoniacal hexafluorosilicic acid solution is further treated with ammonia until the $SiO_2.xH_2O$ is precipitated at a pH value of about 8 to 9. Following separation of the $SiO_2.xH_2O$ deposit, an ammonium fluoride solution is obtained which is substantially free of phosphate and which can then either be used in this form or converted into other fluorides, such as cryolite, for example, by concentration to solid ammonium fluoride or by reaction.

$Fe^{+++}$ compounds suitable for separating the phosphate include oxides, hydroxides and oxide hydroxides that are soluble in the $H_2SiF_6$ solutions (pH~1). The best separation is effected in cases where the $Fe^{+++}:PO_4^{---}$ ratio is adjusted to a value of about 1.3 to 1.6. Following separation of the phosphate, the excess iron enters the $SiO_2$ deposit during hydrolysis in the form of white ammonium fluoro ferrate complexes substantially insoluble in the alkaline range, with the result that the $SiO_2.xH_2O$ deposited may be used as a filler, if desired, since there is no $Fe(OH)_3$ which might color it brown.

The iron(III) compound required to precipitate the phosphate is initially dissolved in the aqueous hexafluorosilicic acid in a heatable vessel equipped with a stirring mechanism. There is no need to wait for the iron compound to dissolve completely before introducing the ammonia because the iron compound is quickly dissolved during heating of the solution by the heat of neutralization. $NH_3$ is then introduced until the pH value rises to about 2 to 4, preferably to about 3, as a result of which the solution is heated to its boiling point, depending upon the $H_2SiF_6$ content and upon the rate at which the $NH_3$ is introduced. The temperature of the solution during the introduction of the ammonia as a gas is maintained between about 60 and 100° C. However, it is preferred to adjust the temperature of from about 80° C. to 90° C. In the case of concentrated solutions, i.e. solutions with an $H_2SiF_6$ content of from about 25 to 30 by weight, the reaction solution should be at a temperature of from about 80° C. to 90° C. to prevent the $(NH_4)_2SiF_6$ formed from precipitating. After the pH has been brought to a value of about 2.5 to 4, the phosphate is precipitated in the form of iron(III)phosphate which is then separated off and washed. After the $FePO_4$ deposit has been removed, more $NH_3$ is usually introduced into the filtrate in order completely to hydrolyze the $SiF_6^{--}$. Complete hydrolysis is usually obtained when the pH reaches about 8 to 9. After the $SiO_2.xH_2O$ deposit has been separated off and washed, a solution containing ammonium fluoride accumulates which is substantially free from phosphate. The solution containing ammonium fluoride may be used, for example, for the production of aluminium fluoride or cryolite or fluoride-containing wood preservatives.

The process according to the invention is illustrated by the following examples, wherein all parts are by weight unless otherwise specified.

Example 1 ($Fe^{+++}:PO_4^{---}$ ratio=1)

0.75 g. of $Fe_2O_3.xH_2O$ (20% of $H_2O$) were added to 480.7 g. of a 30% $H_2SiF_6$ solution containing 0.11% of $P_2O_5$ (0.539 g. $P_2O_5$), after which $NH_3$ was introduced while stirring until the pH value reached 3 at a rate regulated so that the temperature did not exceed 90° C. The voluminous yellowish deposit of $FePO_4$ was filtered off through a steam-heated porcelain suction filter and washed with hot water. 0.064 g. of $P_2O_5$ were obtained in the filtrate, corresponding to a phosphate separation of 88% ($P_2O_5$ content of the filtrate:0.013% by weight).

Example 2 ($Fe^{+++}:PO_4^{---}$ ratio=1.33)

1.00 g. of $Fe_2O_3.xH_2O$ (20% of $H_2O$) were added to 480.3 g. of a 30% $H_2SiF_6$ solution containing 0.11% by weight of $P_2O_5$ (0.53 g. of $P_2O_5$), after which $NH_3$ was introduced with stirring until the pH value reached 3 as described in Example 1. The solution (500.2 g.) freed from the $FePO_4$ deposit contained 0.030 g. of $P_2O_5$ (0.006% by weight), corresponding to a phosphate separation of 94.3%.

Example 3 ($Fe^{+++}:PO_4^{---}$ ratio=1.50)

1.20 g. of $Fe_2O_3.xH_2O$ (20% of $H_2O$) were added to 511.0 g. of a 28% $H_2SiF_6$ solution containing 0.11% by weight of $P_2O_5$ (0.56 g. of $P_2O_5$), after which $NH_3$ was introduced with stirring until the pH value reached 3 at a rate regulated so that the temperature of the solution did not exceed 90° C. After the $FePO_4$ deposit had been separated off and washed with hot water in a steam-heated porcelain suction filter, more ammonia was introduced while cooling until the pH value of the solution had risen to a value of between 8 and 9. After the $SiO_2$ deposit had been separated off and washed, the resulting $NH_4F$ solution (558.2 g.) contained 0.022 g. of $P_2O_5$ (0.004% by weight), corresponding to a phosphate separation of 96.1%.

Example 4 ($Fe^{+++}:PO_4^{---}$ ratio=2)

1.60 g. of $Fe_2O_3.xH_2O$ (20% $H_2O$) were added to 511.0 g. of a 28% hexafluorosilicic acid containing 0.11% by weight of $P_2O_5$ (=0.56 g. of $P_2O_5$), and the resulting mixture was treated as in Example 3. The resulting $NH_4F$ solution (547.5 g.) contained 0.027 g. of $P_2O_5$ (0.005%), corresponding to a phosphate separation of 95.1%.

Various changes and modifications may be made without departing from the spirit and scope of the present invention which is further defined in the appended claims.

What is claimed is:

1. The process for producing a substantially phosphate ion-free ammonium fluoride solution from an aqueous phosphate ion-containing hexafluorosilicic acid solution having a concentration of about 10 to 30%, which comprises adding $Fe^{+++}$ ions to the solution to provide $Fe^{+++}$ in about 1.2 to 2 times the molar amount of the phosphate ions, adding ammonia gas to the solution in quantity sufficient to bring the pH to about 2 to 4, the temperature of the solution during ammonia introduction being maintained between about 60 to 100° C., removing precipitated iron phosphate from the hexafluorosilicic acid solution, continuing the addition of ammonia until the pH ranges from about 8 to 9, and removing the precipitate from the resulting substantially phosphate-free solution of ammonium fluoride.

2. The process according to claim 1, wherein the molar ratio of $Fe^{+++}$ to phosphate is about 1.3 to 1.6.

3. The process according to claim 1, wherein the ammonia is introduced as a gas and the temperature of the solution during introduction is maintained between about 80 and 90° C.

4. The process according to claim 1, wherein the concentration of hexafluorosilicic acid in said solution ranges from about 10 to 20%, the molar ratio of $Fe^{+++}$ to phosphate is about 1.3 to 1.6, and wherein the ammonia rate of introduction is controlled to maintain the temperature between about 80 and 90° C.

References Cited

UNITED STATES PATENTS

| | | | |
|---|---|---|---|
| 1,293,703 | 2/1919 | Catlin | 23—153 |
| 1,859,998 | 5/1932 | Svendsen | 23—88 X |
| 2,785,953 | 3/1957 | Fitch | 23—88 |
| 2,945,745 | 7/1960 | Reeve | 23—88 |
| 3,014,784 | 12/1961 | Knight et al. | 23—105 |
| 3,021,194 | 2/1962 | Cunningham | 23—88 |
| 3,070,423 | 12/1962 | Alexander et al. | 23—105 |
| 3,273,713 | 9/1966 | Parish | 23—153 |
| 3,386,892 | 6/1968 | Schmidt et al. | 23—153 X |

EDWARD STERN, Primary Examiner

U.S. Cl. X.R.

23—105, 153, 182 R